(12) United States Patent
Zoller et al.

(10) Patent No.: US 11,628,531 B2
(45) Date of Patent: Apr. 18, 2023

(54) TOOL PRESETTING AND/OR TOOL MEASURING APPARATUS DEVICE, TOOL PRESETTING AND/OR TOOL MEASURING APPARATUS AND METHOD FOR OPERATING THE TOOL PRESETTING AND/OR TOOL MEASURING APPARATUS DEVICE

(71) Applicant: E. Zoller GmbH & Co. KG Einstell—und Messgeraete, Pleidelsheim (DE)

(72) Inventors: Alexander Zoller, Pleidelsheim (DE); Christian Pfau, Ingersheim (DE); Florian Huck, Pleidelsheim (DE)

(73) Assignee: E. ZOLLER GMBH & CO. KG EINSTELL-UND MESSGERÄTE, Pleidelsheim (DE)

( * ) Notice: Subject to any disclaimer, the term of this patent is extended or adjusted under 35 U.S.C. 154(b) by 309 days.

(21) Appl. No.: 16/999,348

(22) Filed: Aug. 21, 2020

(65) Prior Publication Data

US 2021/0060718 A1 Mar. 4, 2021

(30) Foreign Application Priority Data

Aug. 26, 2019 (DE) ..................... 10 2019 122 785.2

(51) Int. Cl.
*B23Q 5/14* (2006.01)
*B23Q 5/00* (2006.01)
*F16H 37/00* (2006.01)

(52) U.S. Cl.
CPC ........ *B23Q 5/142* (2013.01); *B23Q 2005/005* (2013.01); *B23Q 2705/06* (2013.01)

(58) Field of Classification Search
CPC .............. B23Q 5/142; B23Q 2005/005; B23Q 2705/06; F16H 37/00
(Continued)

(56) References Cited

U.S. PATENT DOCUMENTS

| 6,096,049 A * | 8/2000 | McNeirney ............ A61B 90/13 33/286 |
| 10,667,869 B2 * | 6/2020 | Kotian .................. A61B 6/032 |

(Continued)

FOREIGN PATENT DOCUMENTS

| DE | 87 12 091 U1 | 1/1988 |
| DE | 102011078798 A1 | 1/2012 |
| DE | 102011008513 A1 | 7/2012 |

OTHER PUBLICATIONS

European Search Report dated Jan. 20, 2021; issued in corresponding EP Patent Application No. 20192576.5 (and English Machine Translation).

(Continued)

*Primary Examiner* — Ha Dinh Ho
(74) *Attorney, Agent, or Firm* — Posz Law Group, PLC (57) ABSTRACT

A tool presetting and/or tool measuring apparatus device includes a carrier unit and a spindle unit, in particular motor spindle unit, which is supported by the carrier unit, which is at least configured for a rotation of an object inserted in the spindle unit, in particular a tool and/or a tool holder, around a spindle axis of the spindle unit and which comprises at least one drive unit for generating the rotation movement of the object, wherein the spindle unit includes a coupling unit which is configured, in particular for the purpose of changing a maximally achievable spindle torque, to drive the spindle unit in at least two differing modes.

13 Claims, 6 Drawing Sheets

(58) Field of Classification Search
USPC .............................................. 74/325; 269/71
See application file for complete search history.

(56) References Cited

U.S. PATENT DOCUMENTS

| | | | |
|---|---|---|---|
| 2011/0082467 A1* | 4/2011 | Tien | A61B 90/06 606/130 |
| 2012/0085893 A1 | 4/2012 | Miyamoto et al. | |
| 2019/0117187 A1* | 4/2019 | Patel | A61B 8/4483 |

OTHER PUBLICATIONS

Search Report dated Aug. 12, 2020 issued in corresponding DE patent application No. 10 2019 122 785.2 (and partial English translation).

* cited by examiner

TOOL PRESETTING AND/OR TOOL MEASURING APPARATUS DEVICE, TOOL PRESETTING AND/OR TOOL MEASURING APPARATUS AND METHOD FOR OPERATING THE TOOL PRESETTING AND/OR TOOL MEASURING APPARATUS DEVICE

CROSS REFERENCE TO RELATED APPLICATION

This application is based on and incorporates herein by reference German Patent Application No. 10 2019 122 785.2 filed on Aug. 26, 2019.

STATE OF THE ART

The invention relates to a tool presetting and/or tool measuring apparatus device according to the preamble of claim 1, to a tool presetting and/or tool measuring apparatus according to claim 9 and to a method for an operation of the tool presetting and/or tool measuring apparatus device according to the preamble of claim 11.

A tool presetting and/or tool measuring apparatus device has already been proposed, with a carrier unit and with a spindle unit which is supported by the carrier unit, which is configured at least for a rotation of an object inserted in the spindle unit around a spindle axis of the spindle unit and which comprises at least one drive unit for generating the rotation movement of the object.

The objective of the invention is in particular to provide a generic device having advantageous characteristics regarding flexibility. The objective is achieved according to the invention by the features of patent claims 1, 9 and 11 while advantageous implementations and further developments of the invention may be gathered from the subclaims.

Advantages of the Invention

The invention is based on a tool presetting and/or tool measuring apparatus device with a carrier unit and with a spindle unit, in particular motor spindle unit, which is supported by the carrier unit, which is at least configured for a rotation of an object inserted in the spindle unit, in particular a tool and/or a tool holder, around a spindle axis of the spindle unit and which comprises at least one drive unit for generating the rotation movement of the object.

It is proposed that the spindle unit comprises an, in particular mechanical, coupling unit which is configured, in particular for the purpose of changing a maximally achievable spindle torque, to drive the spindle unit in at least two differing modes. This allows achieving advantageous characteristics in regard to a flexibility of the tool presetting and/or tool measuring apparatus device. Advantageously the spindle unit may have a first drive mode with an especially high precision (with millimeter precision or micrometer precision) of a spindle positioning, and a second drive mode with an especially high torque of, for example, more than 80 Nm. In this way it is advantageously possible to use the same spindle unit for a precision measuring of tools and for a secure tool clamping process. In particular, in this way an advantageous automated tool clamping process is achievable, in which a tool is clamped into a tool holder, in particular a tool holder with collet chuck and union nut, or in which the tool is released out of the tool holder, preferentially without requiring a displacement of the tool holder. This advantageously allows achieving a high degree of automatization and/or accelerating an operational flow. Advantageously, in particular by switching between the two modes, a high level of operational safety is achievable by way of a, preferably mechanical, coupling, for example if in a measuring and/or presetting operation, which may in particular comprise a manual positioning of the tool holder, the mode permitting a high spindle torque is uncoupled.

In particular, the tool presetting and/or tool measuring apparatus device realizes at least a portion of an automated, preferably fully automated, tool clamping unit. By an "automated tool clamping unit" is in particular a device to be understood which is configured for an automated generation and/or an automated transfer to the tool holder at least of a torque that is necessary for a clamping-in of the tool in the tool holder and/or for a clamping-out of the tool out of the tool holder. The term "automated" is in particular to mean, in this context, by machine and/or independently from an operator's input, in particular independently from an operator's input with the exception of an activation, respectively deactivation, of a tool clamping process by the operator and/or of a setting of a machine parameter of the automated tool clamping unit, e.g. a target momentum, by the operator. By a "fully automated tool clamping unit" is in particular a device to be understood which is configured to carry out the tool clamping-in process and/or tool clamping-out process completely independently from an operator's input, in particular with the exception of an activation, respectively deactivation, of the fully automated tool clamping process by the operator and/or of a setting of a machine parameter of the fully automated tool clamping unit. In particular, the fully automated tool clamping unit is configured to carry out, in an automated fashion, in particular at least by machine and/or independently from an operator's input, all work steps of the tool clamping-in process and/or tool clamping-out process from an insertion of the tool holder into the fully automated tool clamping unit until a subsequent removal of the tool holder out of the fully automated tool clamping unit. By a "tool presetting and/or tool measuring apparatus device" is in particular a device to be understood which is at least configured for an at least partial capture and/or presetting at least of a length, at least of an angle, at least of a contour and/or at least of an outer shape of a tool. "Configured" is in particular to mean specifically programmed, designed and/or equipped. By an object being configured for a certain function is in particular to be understood that the object fulfills and/or carries out said certain function in at least one application state and/or operation state.

A "tool" is in particular to mean a tool with a cylindrical shaft. In particular, the tool is implemented as a milling tool. In particular, the tool is implemented as a precision tool, with the tool in particular having a high true-running precision. In particular, the tool is embodied as a reamer, as a hob cutter, as a chisel, as a countersink, and/or preferentially as a drill and/or a milling cutter. A "tool holder" is in particular to mean a structural component which is configured for receiving a tool and for connecting the tool with a machine. In particular, the tool holder is embodied as a tool-machine interface. Preferably the tool holder is embodied as a collet chuck. In particular, the collet chuck comprises a collet. The collet is in particular configured for a force-fit clamping-in of the tool. The collet is in particular tensionable by a tightening of a union nut. By a "union nut" is in particular a structural component to be understood which is configured in such a way that it can be screwed at least partly onto the collet of the tool holder and/or onto a base body of the tool holder. In particular, the union nut comprises an inner thread. In particular, the tool holder comprises an outer thread. In particular, for a clamping-in of the tool into the tool holder, the union nut is put over the tool that is inserted in the tool holder, and is screwed with the tool holder until a predetermined torque is reached. In particular, the union nut is embodied to be at least substantially cylindrical or prism-shaped. In particular, the union nut has a smooth cylinder surface or a smooth prism surface. In particular, the union nut comprises tool surfaces, for example key surfaces, edges, holes, slits or the like, which are configured to facilitate a force transfer from a tool to the union nut. However, preferentially the union nut is realized free of tool surfaces, for example key surfaces, edges, holes, slits or the like. The union nut in particular has an outer diameter that as least substantially corresponds to an outer diameter of the tool holder. In particular, the union nut and/or the tool holder is embodied at least substantially axially symmetrically. However, preferably the union nut and/or the tool holder is embodied at least substantially rotationally symmetrically. "At least substantially rotationally symmetrically" is in particular to mean rotationally symmetrically in the usual range of fault tolerances. In particular, the union nut and/or the tool holder has a high true-running precision. By a "high true-running precision" is in particular a true-running precision to be understood that is smaller than 0.005 mm, preferably smaller than 0.002 mm and preferentially smaller than 0.001 mm.

The "carrier unit" is in particular configured for a stationary positioning at least of the spindle unit in a tool presetting and/or tool measuring apparatus. The carrier unit may form part of a frame unit of the tool presetting and/or tool measuring apparatus, which in particular bears a large portion of a weight force of the tool presetting and/or tool measuring apparatus, or it may be fixedly connected with such a frame unit. The "spindle unit" in particular forms a motor-driven portion of the tool presetting and/or tool measuring apparatus that is configured for holding and/or rotating, in a rotationally fixed manner relative to the spindle unit, the tool holder that is insertable in the spindle unit. The spindle unit is in particular realized as a tool-bearing spindle unit and/or as a tool-chuck bearing spindle unit. The spindle unit comprises a shaft which is precisely supported, which is in particular directly drivable and which comprises a receiving region for tool holders and/or for attachment holders for tool holders. The "drive unit" is in particular configured for rotating the spindle unit, in particular the shaft of the spindle unit. The drive unit comprises a motor unit, in particular an electromotor unit. The drive unit is in particular controllable in a program-controlled and/or operator-controlled manner.

By a "coupling unit" is in particular a unit to be understood which is configured to permit a selection between two differing modes, in particular drive modes, of the spindle unit by an, in particular force-fit and/or form-fit, preferably mechanical, coupling process. The coupling unit may in particular be implemented at least as part of a drive unit of the tool presetting and/or tool measuring apparatus device. By the coupling unit being configured "to drive the spindle unit in two differing modes" is in particular to be understood that the coupling unit is configured to carry out an, in particular mechanical, coupling process which induces a switching between the two modes. The coupling unit may in particular be configured to set a spindle torque that can be created by the drive unit, for example by means of a transmission ratio of a gear of the transmission unit which is allocated to the drive unit. Alternatively or additionally the coupling unit may be configured to connect a further drive unit of the tool presetting and/or tool measuring apparatus device for driving the spindle unit with an augmented spindle torque, or to separate the further drive unit from the spindle unit. The coupling process of the coupling unit required for a switching between the differing modes is in particular different than a purely software-technological and/or actuation-technological setting of differing operation modes of a drive unit. The coupling process of the coupling unit that is required for a switching between the differing modes is in particular different than a simple reversal of a rotation direction of the drive unit. The two differing modes differ at least by their maximally achievable spindle torques.

It is also proposed that the spindle unit generates an essentially higher maximum spindle torque in a second mode of the two modes that can be generated by the coupling unit than in a first mode of the two modes that can be generated by the coupling unit. This advantageously allows achieving a high degree of flexibility. It is in particular advantageously possible to provide one mode for the tool clamping process and one mode for the presetting and/or measuring process. Advantageously a secure fixation of a tool in a tool holder or a reliable releasing of the tool from the tool holder, in particular directly at the measuring point of the tool presetting and/or tool measuring apparatus, can be facilitated. In particular, the maximally achievable spindle torque is at least twice as high, preferably at least five times as high, preferentially at least ten times as high and particularly preferentially at least 50 times as high in one of the differing modes, in particular the second mode, than in the other one of the differing modes, in particular the first mode. In particular, the maximally achievable spindle torque is in the second mode at least 40 Nm, preferentially at least 60 Nm, preferably at least 80 Nm and particularly preferably at least 100 Nm. The two differing modes differ in particular at least concerning an ease of operation of the spindle rotation. In particular, the first mode is configured for a positioning of the tool and/or of the tool holder during the presetting and/or measuring process. In particular, the second mode is configured for a clamping-in and/or clamping-out of tools from tool holders.

If the tool presetting and/or tool measuring apparatus device comprises a further drive unit, which is implemented to be separate and/or different from the drive unit, an especially easy generation of the two differing modes is advantageously achievable. In particular, an advantageous modular character is achievable in this way. It is, for example, possible for already existing systems to be refitted in a simple manner or for newly delivered systems to be equipped with or without an option of a clamping-in and/or clamping-out of tools from collet chucks with union nuts, depending on customers' demands. The further drive unit is in particular configured to rotate the spindle unit, in particular the shaft of the spindle unit. The drive unit comprises a motor unit, in particular an electromotor unit. The drive unit is in particular controllable in a program-controlled and/or operator-controlled manner. In particular, the further drive unit is primarily, preferably exclusively, configured for creating the increased torque required for the, in particular automated, tool clamping-in and/or tool clamping-out process whereas the drive unit is in particular configured to permit a precise, easy-running positioning of a tool clamped in a tool holder or of a tool holder without a tool relative to an optical or tactile measuring system of the tool presetting and/or tool measuring apparatus.

If the coupling unit is moreover configured to couple the further drive unit with the spindle unit and/or to uncouple the further drive unit from the spindle unit, an especially easy switching between the differing modes can be enabled advantageously. Furthermore, in particular due to the possibility of uncoupling the further drive unit, it is achievable that standard operating processes of a tool presetting and/or tool measuring apparatus, like for example rotating the spindle unit manually for a simple and precise positioning of an object that is to be measured, will continue to be possible in a simple, ergonomic and secure manner. Advantageously an already existing standard (the tool presetting and/or tool measuring apparatus) may also be augmented by an additional function (the tool clamping), in particular without requiring a modification of the spindle unit itself. This advantageously allows keeping costs low while at the same time maintaining a high level of operating comfort. Moreover, due to the possibility of a complete uncoupling of the further drive unit a high degree of operational safety is advantageously achievable, in particular as it is possible that, during measuring processes in the course of which a user can intervene manually or during manual loading processes of the spindle unit, the further drive unit can be uncoupled and the maximally achievable spindle torque is therefore small, and thus rather less dangerous, during these manually executable processes.

In addition it is proposed that the coupling unit comprises a form-fit coupling element. This advantageously allows achieving an especially easy coupling and/or uncoupling of the further drive unit with the spindle unit. It is advantageously possible to achieve a coupling with low wear-down, in particular in comparison with a force-fit way of coupling. In particular, the form-fit coupling element is arranged on the spindle unit. In particular, a further form-fit coupling element is arranged on the further drive unit. It is conceivable that, in a coupled state of the coupling unit, the form-fit coupling element and the further form-fit coupling element at least partially engage in one another in a form-fit manner. However, preferentially at least one additional further form-fit coupling element, in particular a gear wheel, or a plurality of additional further coupling elements, in particular gear wheels, are connected between the form-fit coupling element and the further form-fit coupling element, in particular for the purpose of increasing a torque generated by the further drive unit. It is conceivable that, in an uncoupled state of the coupling unit, the form-fit coupling element and the further form-fit coupling element are completely free of a mutual engagement in one another. However, in the uncoupled state of the coupling unit, preferably at least the form-fit coupling element and/or at least the further form-fit coupling element are/is free of an engagement in any further or additional further coupling element. Preferentially, in the uncoupled state, at least two form-fit coupling elements of a chain of form-fit coupling elements, mutually interacting for a transfer of the torque of the further drive unit to the spindle unit, are free of a mutual engagement. In particular, in the uncoupled state of the coupling unit, no torque can be transferred from an output side of the further drive unit to the spindle unit.

If the form-fit coupling element is embodied as a gear wheel that is centered around the spindle axis, it is advantageously possible to facilitate an especially easy and/or effective coupling of the further drive unit with the spindle unit. Advantageously an especially easy and/or effective transfer of a force inducing the spindle torque from the further drive unit to the spindle unit may be made possible. In particular, the gear wheel is embodied as a spur wheel. In particular, the gear wheel may be embodied as a straight-toothed spur wheel or as an obliquely-toothed spur wheel. In particular, the gear wheel is connected with the spindle unit in a rotationally fixed manner. In particular, the gear wheel has an external toothing, which is preferably configured to engage into an external toothing of the further form-fit coupling element for a force transfer. In particular, the further form-fit coupling element is also embodied as a straight-toothed or obliquely-toothed spur wheel.

Beyond this it is proposed that the further drive unit is at least configured, in the coupled state of the coupling unit, to generate a further rotation movement of the object, which is independent from the drive unit, the rotation movement and the further rotation movement comprising a rotation around the same spindle axis. This advantageously allows achieving that in both modes a rotation around the same spindle axis is induced. As a result, it is advantageously possible to ensure a particularly simple clamping-in and/or clamping-out process. In particular, in the coupled state the drive unit is in an idle mode. In particular, in the coupled state the drive unit is non-actuated and/or non-powered. In particular, in the coupled state the further drive unit is at least substantially not influenced by the drive unit. "At least substantially not influenced" is in particular to mean that a loss percentage, induced by the drive unit, of the torque created by the further drive unit is smaller than 2%, preferably smaller than 1% and preferentially smaller than 0.1% of the spindle torque that is maximally achievable by the further drive unit. The "spindle torque" is in particular to be understood as the torque which the object inserted in the spindle unit is subject to in a rotation of the spindle unit.

If the further drive unit comprises a transmission gear, an especially high maximum torque is advantageously achievable, in particular in the coupled state. In particular, the transmission gear is configured to bring about an increase of the torque generated by the further drive unit at least by a factor of 3, preferably at least by a factor of 6, preferentially at least by a factor of 10, and especially preferentially at least by a factor of 20. In particular, the transmission gear is embodied as an epicyclic gear or as a spur wheel gear. In particular the further drive unit can be operated with at least two different speeds. In particular, the further drive unit can be operated with a first speed which is configured, to a large extent, for screwing the union nut on or unscrewing the union nut. In particular, the further drive unit can be operated with a second speed, which is configured for a tightening or for an initial release of the union nut. In particular, the first speed is higher than the second speed, preferably at least twice as high as the second speed. In particular, the torque of the movement with the second speed is higher than, preferably twice as high as, the torque of the movement with the first speed. In particular, the transmission gear is configured for setting the first or the second speed of the further drive unit. In particular, the maximum spindle torque is reached only if the second speed is set. Advantageously it is possible, by way of the two different speeds described, to reduce a time duration required for a tool clamping-in and/or tool clamping-out process. It is in particular possible that the transmission gear is at least partly movable along with the further drive unit. However, preferably the transmission gear is fixedly connected with the carrier unit, at least to a large extent.

It is also proposed that the tool presetting and/or tool measuring apparatus device comprises a holding unit, which is configured for holding the further drive unit on the carrier unit. In this way it is advantageously possible to ensure an effective torque transfer from the further drive unit to the spindle unit. In particular, the holding unit is fixated on the carrier unit. In particular, the further drive unit is fixated on the holding unit. The holding unit in particular forms part of the coupling unit.

Furthermore it is proposed that the holding unit comprises a bearing unit, which is configured to support the further drive unit in a movable manner, in particular in a linearly movable and/or in a pivotable manner. This advantageously allows facilitating a simple coupling and/or uncoupling of the further drive unit with/from the spindle unit. In particular, the bearing unit forms part of the coupling unit. The bearing unit is in particular configured for moving the drive unit relative to the spindle unit.

It is further proposed that a movement of the further drive unit by means of the bearing unit is configured for activating respectively one of the two modes, and in particular while deactivating the other one of the two modes. This advantageously allows achieving an especially easy and/or reliable switching between the modes. In particular, the bearing unit is configured for moving the further drive unit between at least two designated end positions. In a first end position the further drive unit is coupled with the spindle unit. In a second end position the further drive unit is uncoupled from the spindle unit.

Moreover it is proposed that the bearing unit comprises a bearing element, which is in particular realized as a stroke element, preferably a stroke cylinder, and which is configured to generate, in an at least partially automated manner, a movement, in particular a linear movement, of the further drive unit, which is in particular necessary for a coupling of the further drive unit with the spindle unit as well as a movement, in particular a linear movement, of the further drive unit, which is necessary for an uncoupling of the drive unit from the spindle unit. This advantageously allows an especially high degree of automatization, resulting in a reduced work load and/or a reduction of a risk of maloperation. Furthermore an easy switching between the two modes is advantageously achievable. Preferably the bearing element is driven pneumatically or hydraulically. Alternatively the bearing element may be driven in a different manner, for example by an electrical actuating motor. In particular, the bearing element is movable in a computer-program-controlled manner. In particular, the bearing element is configured to generate a stroke of at least 10 mm, preferentially at least 15 mm, preferably at least 25 mm and particularly preferably at least 40 mm.

In addition, a tool presetting and/or tool measuring apparatus with the tool presetting and/or tool measuring apparatus device is proposed, which in particular comprises a, preferably automated, tool clamping unit for a clamping-in and/or clamping-out of tools into/from tool holders with union nuts, in particular tool-surface-free union nuts, which are accommodated in the spindle unit; the tool clamping unit being configured for a tightening or releasing of the union nuts by a rotation of the spindle unit around the spindle axis. This in particular allows achieving advantageous characteristics in regard to a clamping-in and/or clamping-out process of a tool, in particular of a tool requiring a form-fit connection with the union nut and/or preferably a clamping of a union nut—the clamping being realized at least partly, in particular at least to a large extent in a force-fit manner—for a manipulation of the union nut in a tool clamping-in process and/or tool clamping-out process, into a tool holder and/or from a tool holder. Advantageously a high degree of automatization is achievable. This advantageously allows achieving a high clock rate of the tool clamping-in and/or tool clamping-out process, which in particular results in a high level of efficiency. Moreover, advantageously an adjustment of a tool tension force and/or a tool clamping torque, providing the best possible precision and/or being constant over a plurality of different tool clamping processes, can be facilitated by the tool clamping unit.

Beyond this a method for an operation of the tool presetting and/or tool measuring apparatus device is proposed, in which the coupling unit has at least two coupling positions, wherein in a first coupling position the spindle unit is driven in the first mode by a drive unit, and wherein in a second coupling position the spindle unit is driven in the second mode, alternatively to the drive unit or in addition to the drive unit, by a further drive unit which is implemented to be separate and/or different from the drive unit. In this way a high flexibility of the tool presetting and/or tool measuring apparatus device is advantageously achievable. In particular, the first coupling position corresponds to the second end position of the bearing unit. In particular, the second coupling position corresponds to the first end position of the bearing unit.

It is also proposed that in the method for an operation of the tool presetting and/or tool measuring apparatus device, in a coupling process of the coupling unit, in which the further drive unit is coupled with the spindle unit, the spindle unit is rotated by the drive unit with a low rotation speed. This advantageously allows improving a coupling. In particular, a simple establishment of the form-fit connection between form-fit coupling elements is advantageously achievable. In particular, this permits achieving a tooth head of the form-fit coupling element that is to be coupled, in particular of the further form-fit coupling element, easily engaging into a tooth gap of a corresponding form-fit coupling element or vice versa. In particular, in a traversing of the further drive unit via the bearing unit, in order to establish the coupled state, the spindle unit is slowly rotated by the drive unit. A "low rotation speed" is in particular to mean a rotation speed of maximally 5 degrees per second, preferentially maximally 10 degrees per second, preferably maximally 45 degrees per second and particularly preferably no more than 90 degrees per second.

The tool presetting and/or tool measuring apparatus device according to the invention, the tool presetting and/or tool measuring apparatus according to the invention and the method according to the invention are herein not to be restricted to the form of application and realization described above. In particular, to implement a functionality described here, the tool presetting and/or tool measuring apparatus device according to the invention, the tool presetting and/or tool measuring apparatus according to the invention and the method according to the invention may have a number of respective elements, structural components and units that differs from the number given here.

DRAWINGS

Further advantages will become apparent from the following description of the drawings. The drawings show an exemplary embodiment of the invention. The drawings, the description and the claims contain a plurality of features in combination. Someone skilled in the art will purposefully also consider the features individually and will find further expedient combinations.

It is shown in.

DESCRIPTION OF THE EXEMPLARY EMBODIMENT

Figure 1:
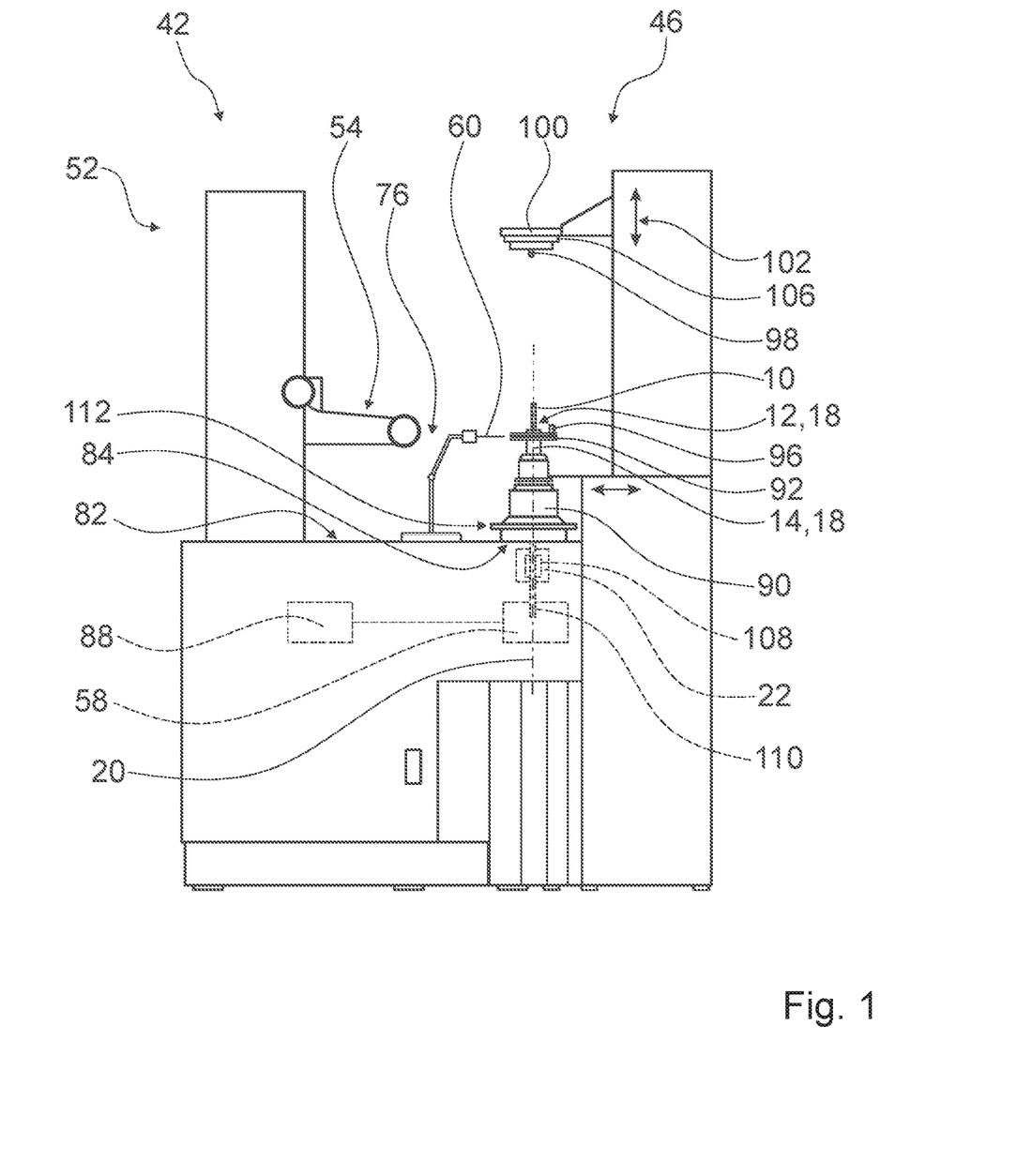
FIG. 1 a schematic representation of a tool presetting and/or tool measuring apparatus with a tool and a tool holder, FIG. 2 a schematic perspective view of the tool holder, FIG. 3 a schematic perspective view of a tensioning element of the tool presetting and/or tool measuring apparatus, FIG. 4 a schematic perspective view of a torque receiving element of the tool presetting and/or tool measuring apparatus, FIG. 5 a schematic perspective view of a tool presetting and/or tool measuring apparatus device of the tool presetting and/or tool measuring apparatus in a first coupling position, FIG. 6 a schematic perspective view of the tool presetting and/or tool measuring apparatus device in a second coupling position, and FIG. 7 a schematic flow chart of a method for an operation of the tool presetting and/or tool measuring apparatus device.
Figure 2:
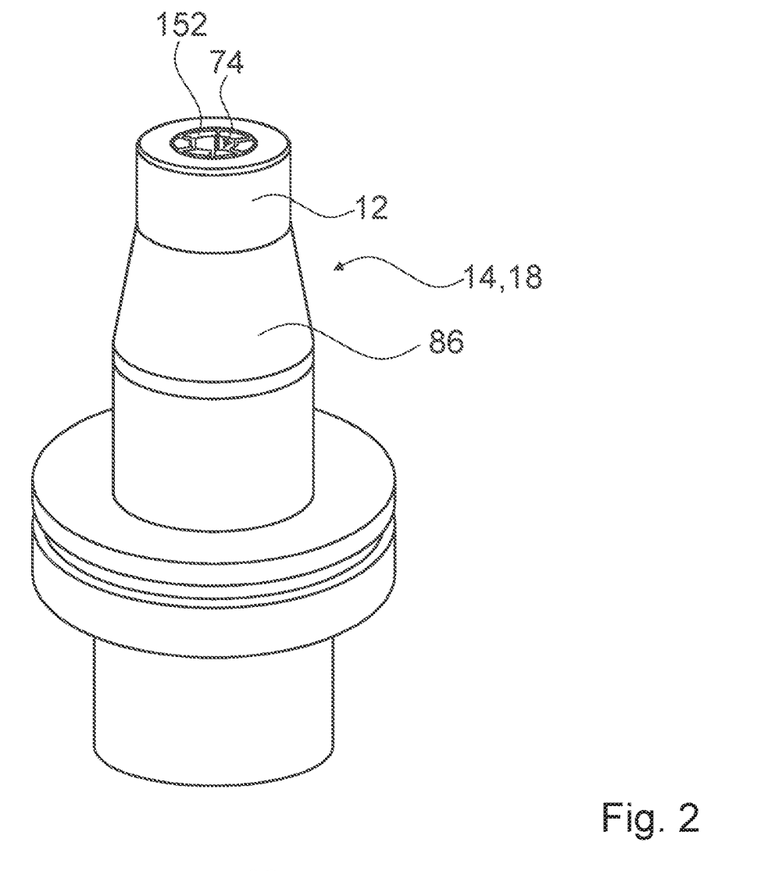

FIG. 1 shows a tool presetting and/or tool measuring apparatus 42, which is configured at least for a presetting and/or a, preferably optical, measuring of an object 18. In the exemplary embodiment shown the object 18 is realized as a tool 10. The tool presetting and/or tool measuring apparatus 42 is configured for a presetting and/or a, preferably optical, measuring of the tool 10 that is clamped in a tool holder 14. The tool holder 14 is embodied as a collet chuck (cf. also FIG. 2). The tool holder 14 comprises a union nut 12. The tool holder 14 comprises a base body 86. The union nut 12 is realized in such a way that it is screwable onto the base body 86. The tool holder 14 comprises a tool receiving opening 74. The tool receiving opening 74 is configured for an insertion and/or an accommodation of a tool shaft of a tool 10. The tool holder 14 comprises a collet 152. The collet 152 is arranged in the tool receiving opening 74 of the tool holder 14. The union nut 12 is configured to be guided over a tool 10 that is inserted in the tool receiving opening 74 and to be screwed with the base body 86 of the tool holder 14. The collet 152 is configured to be tensioned by a screwing-on of the union nut 12. The collet 152 is configured for fixating a tool 10 in the tool receiving opening 74 by a screwing-on of the union nut 12.

The tool presetting and/or tool measuring apparatus 42 comprises a measuring tower 52. The measuring tower 52 comprises an optical measuring device 54. The optical measuring device 54 is configured for a measuring and/or presetting of a tool 10 that is clamped in the tool holder 14, in particular at least of a cutter of the tool 10 that is clamped in the tool holder 14. The optical measuring device 54 is embodied as a transmitted-light measuring device. Alternatively or additionally the tool presetting and/or tool measuring apparatus 42 may comprise a reflected-light measuring device. The optical measuring device 54 is traversable vertically along the measuring tower 52. The tool presetting and/or tool measuring apparatus 42 comprises a measuring table 82. The measuring tower 52 is implemented to be horizontally traversable along the measuring table 52. The tool presetting and/or tool measuring apparatus 42 comprises a control and/or regulation unit 88. The control and/or regulation unit 88 is configured at least for a control and/or regulation of the movement and/or the function of the measuring tower 52 and/or of the optical measuring device 54. The control and/or regulation unit 88 comprises at least an electronic computing unit.

The tool presetting and/or tool measuring apparatus 42 comprises an attachment holder 90. The attachment holder 90 is configured for receiving the tool holder 14 in a rotationally fixed manner. The attachment holder 90 is adapted to an outer shape of the tool holder 14. The tool presetting and/or tool measuring apparatus 42 comprises a plurality of differently shaped attachment holders 90, which are adapted to different outer shapes of different tool holders 14. The attachment holder 90 is implemented to be exchangeable.

The tool presetting and/or tool measuring apparatus 42 comprises an angle sensor unit 58. The angle sensor unit 58 is configured for sensing a rotation angle, a rotation direction and/or a rotation speed of the attachment holder 90 relative to the measuring table 82 of the tool presetting and/or tool measuring apparatus 42. The angle sensor unit 58 is embodied partially integrally with the control and/or regulation unit 88. Alternatively or additionally the angle sensor unit 58 is configured to transmit at least angle measuring data and/or angular velocity measuring data to the control and/or regulation unit 88 and/or to receive and/or process at least control and/or regulation commands from the control and/or regulation unit 88.

The tool presetting and/or tool measuring apparatus 42 comprises a handling robot 76. The handling robot 76 is configured to automatedly put a tensioning element 92 of the tool presetting and/or tool measuring apparatus device 42 onto the tool holder 14 and/or to take the tensioning element 92 off the tool holder 14. The handling robot 76 is embodied as a multi-axial industrial robot. The handling robot 76 comprises a gripper unit 60. The gripper unit 60 is configured for gripping, picking up and/or depositing tensioning elements 92.

The tool presetting and/or tool measuring apparatus 42 comprises an automated tool clamping unit 46. The tool clamping unit 46 is fully automated. The tool clamping unit 46 is configured for clamping at least one tool 10 into the tool holder 14 by a tightening of the union nut 12 and/or for clamping the tool 10 out of the tool holder 14 by a releasing of the union nut 12. The tool clamping unit 46 comprises the tensioning element 92 (cf. also FIG. 3). The tensioning element 92 is implemented in such a way that it can be loosely put onto the tool holder 14. The tensioning element 92 is implemented in such a way that it can be loosely taken off the tool holder 14. The tensioning element 92 is configured for establishing a connection with the union nut 12 of the tool holder 14. The tensioning element 92 comprises a connection mechanism 70. The connection mechanism 70 is configured for establishing the connection of the tensioning element 92 with the union nut 12. The connection of the tensioning element 92 with the union nut 12 is embodied as a clamping connection. The connection mechanism 70 of the tensioning element 92 is embodied as a clamping mechanism. The connection mechanism 70 of the tensioning element 92, which is shown in FIG. 3 and is embodied as a clamping mechanism, is configured for establishing a largely force-fit connection with the union nut 12 of the tool holder 14.

Figure 3:
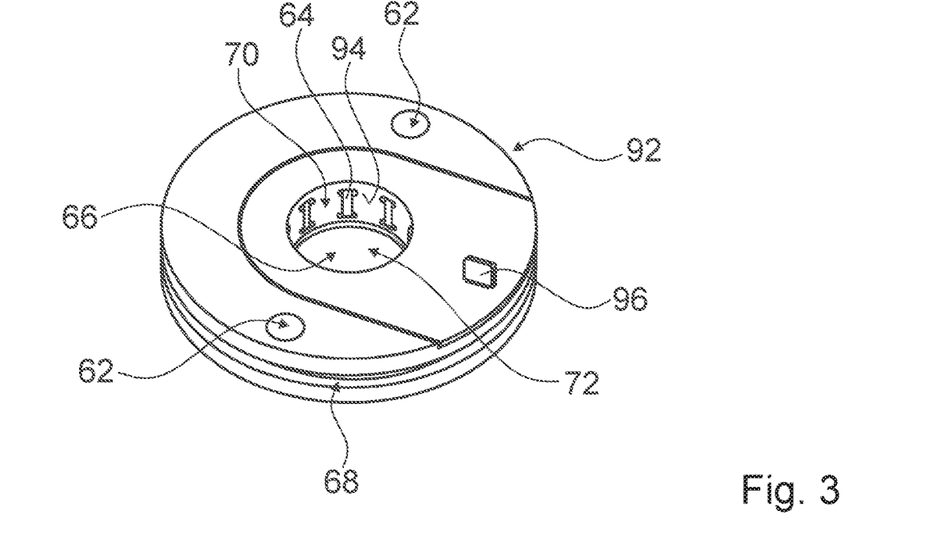

The tensioning element 92 shown in FIG. 3 comprises a clamping region 66. The clamping region 66 is configured for receiving the union nut 12. The clamping region 66 is configured for encompassing the union nut 12. The clamping region 66 forms a recess 72 in the tensioning element 92. The recess 72 of the tensioning element 92 has a shape that corresponds to an outer shape of the union nut 12. The tensioning element 92 comprises a plurality of clamping elements 64. The clamping elements 64 are arranged such that they are distributed along a wall 94 of the recess 72 of the tensioning element 92. The clamping elements 64 are configured for fixedly clamping the union nut 12 in the clamping region 66. The clamping elements 64 are configured for clamping a cylinder-shaped union nut 12, which is realized free of tool surfaces.

The connection mechanism 70 is embodied such that it is operable in a ratchet-wise manner. In a state when the tensioning element 92 is connected with a tool 10, the tensioning element 92 is rotatable, by means of the ratchet-wise operable connection mechanism 70, around a rotation axis extending parallel to an insertion direction of the tool 10 in the clamping region 66, partly around the tool 10 in a rotation direction, whereas it is rotatable in a clamping rotation direction, which is opposite to the rotation direction, only together with the tool 10. A rotation of the tensioning element 92 in the clamping rotation direction is configured for a tightening and/or releasing of a union nut 12. In contrast, a rotation of the tensioning element 92 in the rotation direction that is opposite to the clamping rotation direction does not result in a tightening and/or releasing of the union nut 12. The clamping rotation direction is selectable. The tensioning element 92 comprises a switch element 96, which is configured to enable a switching between two opposite-oriented clamping rotation directions of the ratchet-wise operable connection mechanism 70.

The tensioning element 92 comprises a holding element 68. The holding element 68 is embodied as a gripper groove. The holding element 68 is configured to form an attack surface for the gripper unit 60 of the handling robot 76. For the purpose of receiving the tensioning element 92 by means of fork-shaped gripper elements of the gripper unit 60, the gripper unit 60 of the handling robot 76 is configured to engage into the holding element 68 in a form-fit fashion. The tensioning element 92 comprises corresponding torque transfer elements 62. The corresponding torque transfer elements 62 are configured for a coupling with torque transfer elements 98 of a torque receiving element 100 of the tool clamping unit 46.

Figure 4:
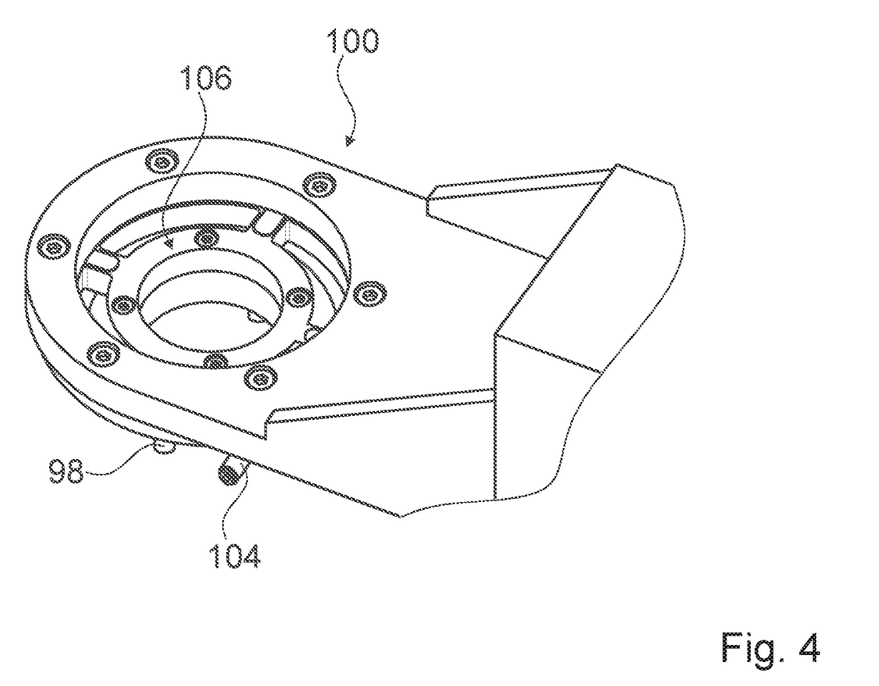

The tool clamping unit 46 comprises the torque receiving element 100 (cf. also FIG. 4). The torque receiving element 100 is configured for receiving a large portion of a torque occurring during a tool clamping process. The torque receiving element 100 and the tensioning element 92 are implemented separately from each other. The torque receiving element 100 comprises the torque transfer element 98. The torque transfer element 98 of the torque receiving element 100 is configured for a rotationally fixed coupling of the torque receiving element 100 with the tensioning element 92. For a coupling of the tensioning element 92 with the torque receiving element 100, the torque transfer element 98 of the torque receiving element 100 and the corresponding torque transfer element 62 of the tensioning element 92 engage mutually. The torque transfer element 98 is embodied as a pin. The corresponding torque transfer element 62 is embodied as a recess.

The tool presetting and/or tool measuring apparatus 42 comprises a vertical positioning unit 102. The vertical positioning unit 102 is configured to permit a vertical traversing of the torque receiving element 100. The vertical traversing of the torque receiving element 100 allows implementing a coupling of the torque transfer elements 62, 98. A vertical lowering of the torque receiving element 100 toward a tensioning element 92 that has been put onto the tool holder 14 results in an engagement of the torque transfer element 98 of the torque receiving element 100 into the corresponding torque transfer element 62 of the tensioning element 92. At least the position and/or at least the traversing velocity of the vertical positioning unit 102 can be set by means of the control and/or regulation unit 88. It is for example conceivable that positional and dimensional data captured by the optical measuring device 54 are processed by the control and/or regulation unit 88 and converted into control commands for the vertical positioning unit 102. This advantageously allows enabling a precise and/or damage-free coupling of the torque transfer elements 62, 98. In particular, it is conceivable that the optical measuring device 54 is configured to identify faultily positioned tensioning elements 92, for example tensioning elements 92 lying on the tool holder 14 in a skewed and/or oblique fashion, and to consequently prevent a lowering of the torque receiving element 100, respectively a coupling of the torque receiving elements 62, 98 with each other. In this way malfunctioning or damaging of the tool clamping unit 46 are/is advantageously avoidable.

The torque receiving element 100 comprises an actuation element 104. The actuation element 104 is configured for actuating the switch element 96 of the tensioning element 92. The torque receiving element 100 comprises a pneumatic cylinder that is configured to generate a movement at least of a portion of the actuation element 104, which is configured to actuate the switch element 96 mechanically.

The torque receiving element 100 comprises a torque sensor 106. The torque sensor 106 is configured for sensing a torque applied to the torque receiving element 100. The torque sensor 106 is embodied as a torque-measuring flange. The torque sensor 106 comprises a torque pickup. The torque pickup is realized as a spring body. Alternatively or additionally it is possible for the torque pickup to function by a piezo-electric, magneto-elastic and/or optical principle. The control and/or regulation unit 88 is configured for reading out and/or receiving data of the torque sensor 106. The control and/or regulation unit 88 is configured for a control and/or regulation of a course of a torque exerted onto the union nut 12 by the tool clamping unit 46 in the tool clamping process. The control and/or regulation unit 88 is configured for setting a maximum torque exerted onto the union nut 12 by the tool clamping unit 46 in the tool clamping process.

The tool presetting and/or tool measuring apparatus 42 comprises a tool presetting and/or tool measuring apparatus device 44. The tool presetting and/or tool measuring apparatus device 44 comprises a spindle unit 84. The spindle unit 84 is implemented as a motor spindle unit. The spindle unit 84 is configured for receiving the attachment holder 90. The spindle unit 84 is configured for a rotationally fixed coupling with an attachment holder 90. Alternatively the spindle unit 84 may also be configured to receive the tool 10 or the tool holder 14 directly. The spindle unit 84 has a spindle axis 20. The spindle axis 20 extends centrally through the spindle unit 84. The spindle axis 20 implements a central rotation axis of the spindle unit 84. The spindle unit 84 is realized so as to be rotatable. The spindle unit 84 is configured for a rotation of the object 18, in particular the tool 10 and/or the tool holder 14, which is inserted in the spindle unit 84 around the spindle axis 20. The spindle unit 84 comprises a drive unit 22. The drive unit 22 is configured for generating the rotation movement of the object 18, in particular the tool 10 and/or the tool holder 14, around the spindle axis 20. The drive unit 22 is configured for generating the rotation movement at least of the portion of the spindle unit 84 which holds the tool 10 and/or the tool holder 14. The drive unit 22 is configured for generating the rotation movement of the attachment holder 90. The drive unit 22 comprises a drive motor 108. The spindle unit 84 comprises a drive shaft 110. The drive shaft 110 is configured to transfer a torque created by the drive motor 108 at least onto the portion of the spindle unit 84 which holds the tool 10 and/or the tool holder 14, in particular the attachment holder 90. The tool clamping unit 46 is configured for tightening or releasing union nuts 12 from tool holders 14 by a rotation of the spindle unit 84 around the spindle axis 20.

The spindle unit 84 forms a torque generation unit 112. The torque generation unit 112 is embodied separately from the tensioning element 92 and/or separately from the torque receiving element 100. The torque generation unit 112 is configured to create a torque that is necessary for a tool clamping-in and/or tool clamping-out process. The torque generation unit 112 is implemented integrally with the spindle unit 84. The torque generation unit 112 is implemented integrally with a unit of the tool presetting and/or tool measuring apparatus 42, which is configured for a positioning of the tool 10 during a presetting and/or measuring process of the tool presetting and/or tool measuring apparatus 42, for example by means of the optical measuring device 54. The torque generation unit 112, in particular the torque generated by the torque generation unit 112 and/or the rotation generated by the torque generation unit 112, can be controlled via the control and/or regulation unit 88. A control and/or regulation of the torque and/or the rotation of the torque generation unit 112 is brought about on the basis of measuring data of the torque sensor 106.

Figure 5:
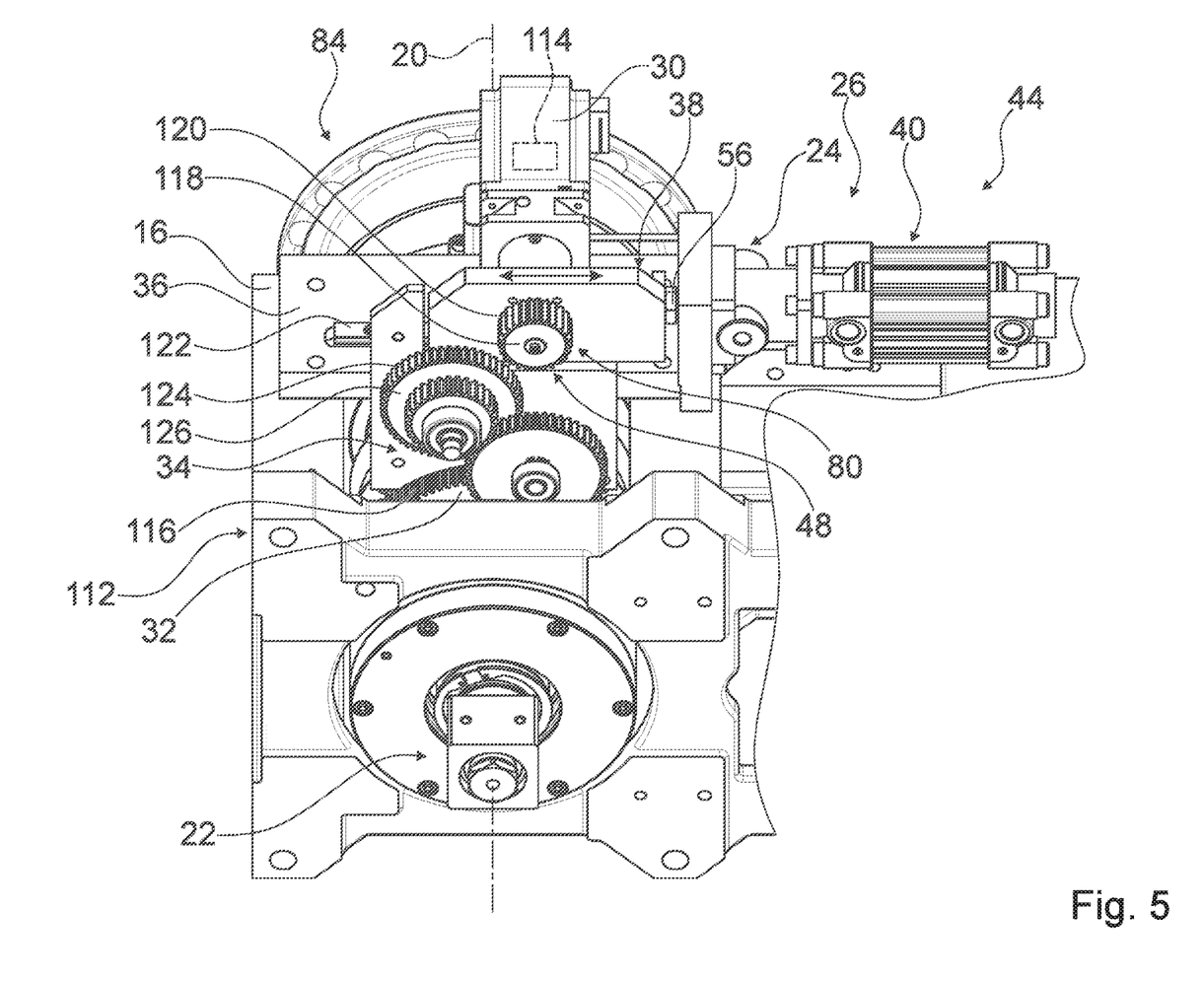

FIG. 5 shows a schematic perspective view of a portion of the tool presetting and/or tool measuring apparatus 42 with the tool presetting and/or tool measuring apparatus device 44. The spindle unit 84 is fixedly connected with the tool presetting and/or tool measuring apparatus 42. The tool presetting and/or tool measuring apparatus device 44 comprises a carrier unit 16. The carrier unit 16 carries the spindle unit 84. The carrier unit 16 is connected with the tool presetting and/or tool measuring apparatus 42 in a positionally and rotationally fixed manner.

The tool presetting and/or tool measuring apparatus device 44 comprises a further drive unit 30. The further drive unit 30 is implemented separately from the drive unit 22. The further drive unit 30 is implemented separately from the drive unit 22. The further drive unit 30 is embodied separately from the spindle unit 84. The further drive unit 30 is implemented differently than the spindle unit 84. The further drive unit 30 comprises a further drive motor 114. The further drive motor 114 is embodied separately from the drive motor 108. The further drive unit 30 comprises a transmission gear 34. The transmission gear 34 is embodied as a spur wheel gear. The transmission gear 34 is fixated on the carrier unit 16.

The spindle unit 84 comprises a coupling unit 24. The coupling unit 24 is configured for coupling the further drive unit 30 with the spindle unit 84. The coupling unit 24 comprises a form-fit coupling element 32. The form-fit coupling element 32 is allocated to the spindle unit 84. The form-fit coupling element 32 is connected with the spindle unit 84 in a rotationally fixed manner. The form-fit coupling element 32 is embodied as a gear wheel that is centered around the spindle axis 20 of the spindle unit 84. The form-fit coupling element 32 is embodied as a spur wheel. The form-fit coupling element 32 comprises an external toothing 116. The teeth of the external toothing 116 of the form-fit coupling element 32 point away from the spindle axis 20 in radial directions of the spindle axis 20. The coupling unit 24 comprises a further form-fit coupling element 118. The further form-fit coupling element 118 is allocated to the further drive unit 30. The further form-fit coupling element 118 is connected with an output side of the further drive unit 30 in a rotationally fixed manner. The further form-fit coupling element 118 is embodied as a spur wheel. The further form-fit coupling element 118 comprises an external toothing 120. The external toothing 120 of the further form-fit coupling element 118 is configured, in a coupled state of the coupling unit 24, to engage into an external toothing 124 of at least one additional further form-fit coupling element 126 of the tool presetting and/or tool measuring apparatus device 44, in particular the transmission gear 34, the spindle unit 84 and/or the further drive unit 30, in a form-fit fashion. In the coupled state the form-fit coupling elements 32, 118 are configured to transfer the torque created by the further drive unit 30 and/or the transmission gear 34 to the spindle unit 84, and in particular to convert said torque into a spindle torque. The further drive unit 30 is configured, in the coupled state of the coupling unit 24, to generate a further rotation movement of the object 18, in particular the tool 10 and/or the tool holder 14, which is substantially independent from the drive unit 22, wherein the rotation movement and the further rotation movement comprise a rotation around the same spindle axis 20.

The tool presetting and/or tool measuring device 44 comprises a holding unit 36. The holding unit 36 is configured for holding the further drive unit 30 on the carrier unit 16. The carrier unit 16 holds the further drive unit 30. The holding unit 36 is fixated on the carrier unit 16. The holding unit 36 comprises a bearing unit 38. The bearing unit 38 is configured to movably support the further drive unit 30 relative to the spindle unit 84. The bearing unit 38 comprises a bearing rail 122. The bearing rail 122 is configured to guide a movement of the drive unit 30 relative to the spindle unit 84. The bearing rail 122 realizes a linear guidance. The bearing unit 38 comprises a bearing element 40. The bearing element 40 is configured to generate the movement of the further drive unit 30, in particular along the bearing rail 122. The bearing element 40 is embodied as a stroke element 56, in particular a pneumatic cylinder. The control and/or regulation unit 88 is at least configured for controlling and/or regulating the movement of the further drive unit 30 via the bearing element 40 and/or via the function of the bearing element 40.

The coupling unit 24 is configured, for the purpose of changing a maximally achievable spindle torque, to drive the spindle unit 84 in at least two differing modes 26, 28. The spindle unit 84 generates an essentially higher maximum spindle torque in the second mode 28 of the two modes 26, 28 that can be generated by the coupling unit 24 than in the first mode 26 of the two modes 26, 28 that can be generated by the coupling unit 24. A movement of the further drive unit 30 by means of the bearing unit 38 is configured to activate respectively one of the two modes 26, 28. In FIG. 5 the coupling unit 24 is shown in a first coupling position 48. In the first coupling position 48 the coupling unit 24 is in the uncoupled state. In the first coupling position 48 the spindle unit 84 is driven in the first mode 26. In the first mode 26 the spindle unit 84 is driven exclusively by the drive unit 22. The first mode 26 is configured for a precision positioning of the tool holder 14, in particular in a presetting and/or measuring process of the tool presetting and/or tool measuring apparatus 42. In the first mode 26 the spindle unit 84 is rotatable in an easy-running and/or manual fashion. In the first coupling position 48 the further form-fit coupling element 118 is free of an engagement in other form-fit coupling elements. In the first coupling position 48 the further drive unit 30 is in a second end position 80. In the first coupling position 48 the further drive unit 30 has been brought into the second end position 80 by the bearing unit 38.

Figure 6:
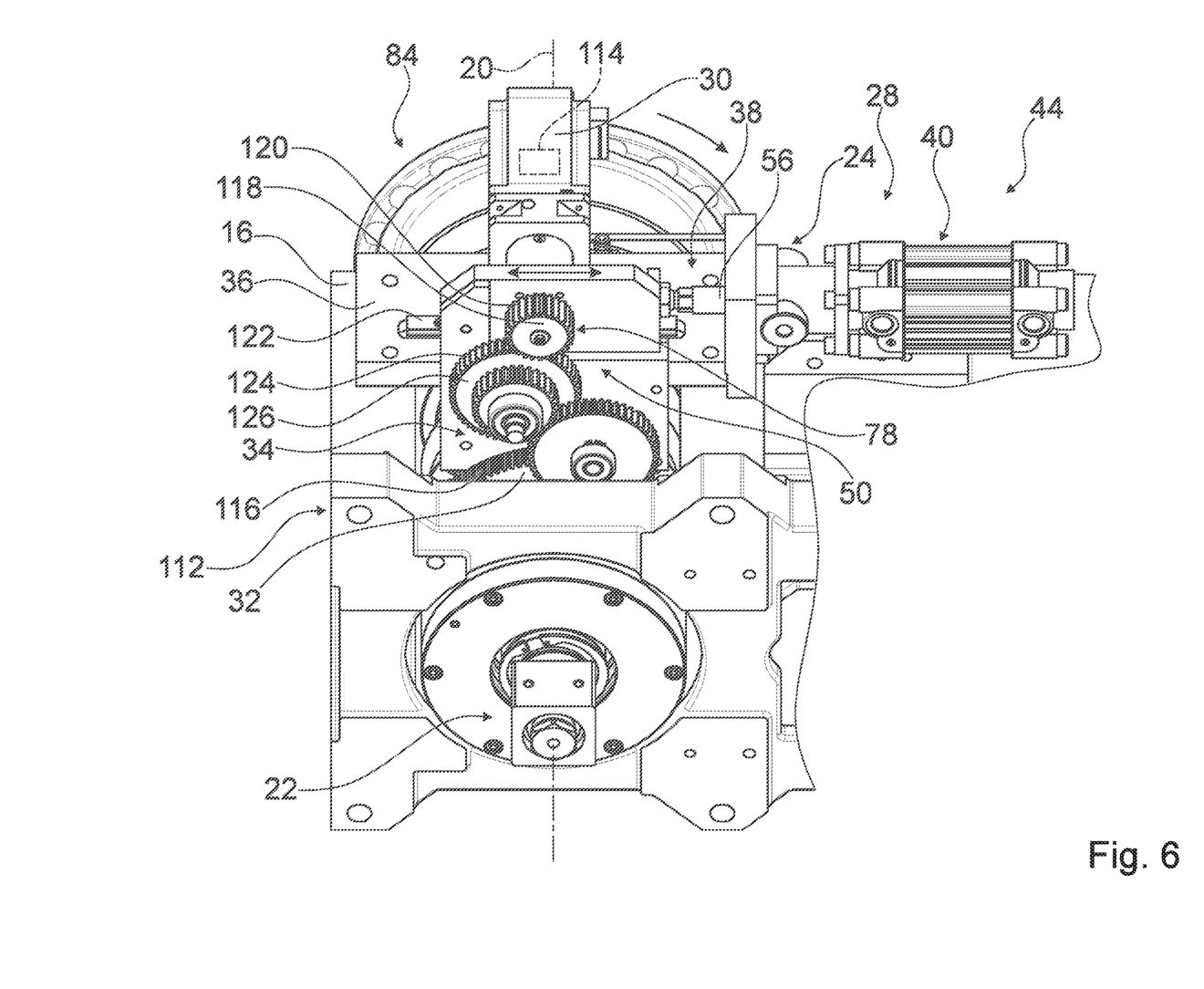

FIG. 6 shows another schematic perspective view of the portion of the tool presetting and/or tool measuring apparatus 42 with the tool presetting and/or tool measuring apparatus device 44, with the coupling unit 24 shown in a second coupling position 50. In the second coupling position 50 the coupling unit 24 is in the coupled state. In the second coupling position 50 the spindle unit 84 is driven in the second mode 28. In the second mode 28 the spindle unit 84 is driven, alternatively to the drive unit 22 or in addition to the drive unit 22, by the further drive unit 30. The second mode 28 is configured to create a fixation and/or releasing torque for a fixation and/or releasing of tools 10 into and/or out of tool holders 14, in particular in the tool clamping-in and/or tool clamping-out process. In the second mode 28 the spindle unit 84 cannot be rotated manually. In the second mode 28 the spindle unit 84 is rotatable with different speeds, in particular with a first speed for a screwing-on and/or screwing-off of a union nut 12 and with a second speed for a final tightening and/or an initial loosening of the union nut 12. In the second coupling position 50 the further form-fit coupling element 118 is in engagement in at least one other form-fit coupling element, in particular the additional further form-fit coupling element 126 of the transmission gear 34 or the form-fit coupling element 32. In the second coupling position 50 the further drive unit 30 is in a first end position 78. In the second coupling position 50 the further drive unit 30 has been brought into the first end position 78 by the bearing unit 38. The bearing element 40 is configured to move the further drive unit 30 back and forth between the first end position 78 and the second end position 80.

Figure 7:
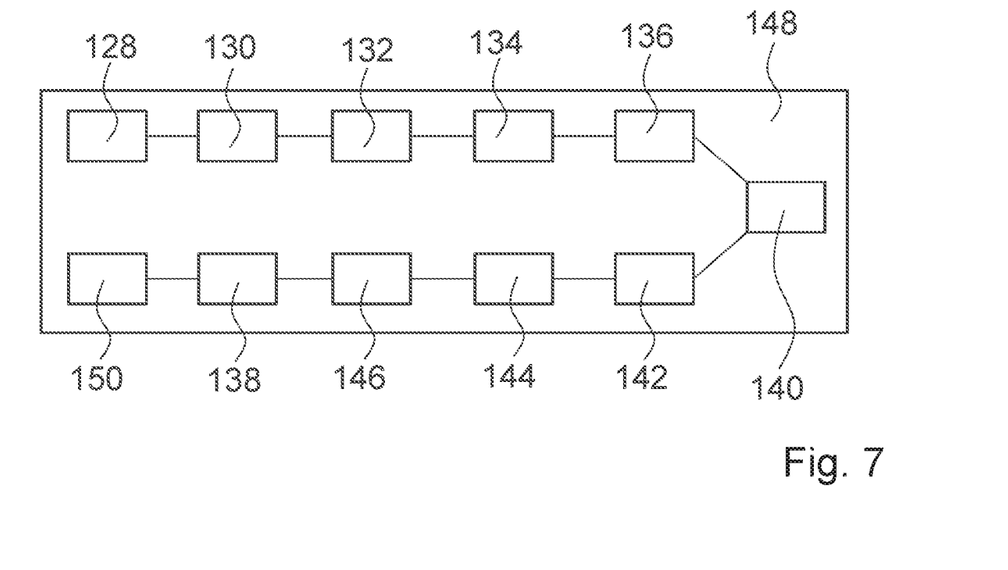

FIG. 7 shows a schematic flow chart of a method 148 for an operation of the tool presetting and/or tool measuring apparatus device 44, in which the tool 10 is clamped into the tool holder 14 by a tightening of the union nut 12 of the tool holder 14, and/or is clamped out of the tool holder 14 by a releasing of the union nut 12. In the method 148, for the purpose of changing a maximally achievable spindle torque, in particular to achieve a tensioning and/or releasing torque necessary for a tensioning or releasing of the union nut 12, the spindle unit 84 is driven in two differing modes 26, 28, depending on the coupling position 48, 50 of the coupling unit 24.

For the automated clamping-in of the tool 10 into the tool holder 14, in at least one method step 128 the tensioning element 92 is picked up by the handling robot 76 and is put upon the tool holder 14 in which a tool 10 is inserted. In at least one further method step 130 the tensioning element 92 is clamped with the union nut 12 of the tool holder 14. In at least one further method step 132 the torque receiving element 100 is traversed, in particular lowered, by the vertical positioning unit 102. In at least one further method step 134 the torque receiving element 100 is lowered by the vertical positioning unit 102 so far that the torque transfer element 98 of the torque receiving element 100 is coupled with the torque transfer element 62 of the tensioning element 92 in a rotationally fixed manner. In at least one further method step 136 the switch element 96 of the tensioning element 92 is switched by means of the actuation element 104 of the torque receiving element 100 such that the union nut 12 and the tensioning element 92 are coupled with each other, in a rotationally fixed manner, in a rotation direction that is configured for a tightening of the union nut 12. In at least one further method step 140 the first coupling position 48 is taken by the coupling unit 24. In the method step 140 the further drive unit 30 is brought into the second end position 80 by the bearing unit 38. In the method step 140 the further drive unit 30 is traversed into the second end position 80 by the bearing element 40. In the method step 140 a form-fit connection of the further form-fit coupling element 118 is undone. In at least one further method step 142 the union nut 12 of the tool holder 14 is screwed onto the tool holder 14 by an, in particular fast, rotation of the spindle unit 84 around the spindle axis 20. In the method step 142 the union nut 12 is tightened to a first limit torque. In the method step 142 the spindle unit 84 is driven by the drive unit 22 in the first mode 26. In the tightening of the union nut 12 to the first limit torque, the instantaneous torque is monitored by the control and/or regulation unit 88 of the tool clamping unit 46. The first limit torque is predetermined by the control and/or regulation unit 88. It is herein conceivable that the first limit torque is entered into the control and/or regulation unit 88 in advance, manually or at least partly automatedly, by an operator. In at least one further method step 144 the tool 10, pre-tensioned with the first limit torque, is measured and/or preset, in particular measured and preset to length, by means of the tool presetting and/or tool measuring apparatus 42.

In at least one further method step 146 the second coupling position 50 is taken by the coupling unit 24. In the method step 146 the further drive unit 30 is brought into the first end position 78 by the bearing unit 38. In the method step 146 the further drive unit 30 is traversed into the first end position 78 by the bearing element 40. In the method step 146 a form-fit connection of the further form-fit coupling element 118 is established. In the method step 146, in the coupling process of the coupling unit 24 in which the further drive unit 30 is coupled with the spindle unit 84, the spindle unit 84 is rotated by the drive unit 22 of the spindle unit 84 with a low rotation speed. In at least one further method step 138 the union nut 12 of the tool holder 14 is tightened to a second limit torque, in particular a clamping torque, by a rotation of the spindle unit 84. The second limit torque is herein by a multi-fold greater than the first limit torque. In the method step 138 the spindle unit 84 is driven, in particular rotated, instead of the drive unit 22 or in addition to the drive unit 22, by the further drive unit 30. In the method step 146 the spindle unit 84 is driven in the second mode 28. In the tightening of the union nut 12 to the second limit torque, the instantaneous torque is monitored by the control and/or regulation unit 88 of the tool clamping unit 46. The second limit torque is predetermined by the control and/or regulation unit 88. It is herein conceivable that the second limit torque is entered into the control and/or regulation unit 88 in advance, manually and/or at least partly automatedly, by an operator. Alternatively or additionally it is conceivable that for the setting of the second limit torque a movement of a mark on the union nut 12 and/or on the base body 86 of the tool holder 14 is monitored by means of the optical measuring device 54. For this, for example a congruency of two marks on oppositely-rotated parts of the tool holder 14 may be monitored. In at least one further method step 150 the clamping of the tensioning element 92 with the union nut 12 is released and the tensioning element 92 is taken off the tool holder 14 by the handling robot 76. An automated clamping-out of the tool 10 out of the tool holder 14 proceeds in a manner comparable to the method 148 described above; however the spindle unit 84 is driven in the inverse rotation direction, with the spindle unit 84 being operated first in the second mode 28 with an increased spindle torque for an initial loosening of the union nut 12 and then in the first mode 26 for a complete screwing-off of the union nut 12. Further details of the clamping-out method are also described in a German patent application having the application number 10 2018 116 263.4, whose contents are completely incorporated into the present patent application by reference.

REFERENCE NUMERALS 10 tool
12 union nut
14 tool holder
16 carrier unit
18 object
20 spindle axis
22 drive unit
24 coupling unit
26 first mode
28 second mode
30 further drive unit
32 form-fit coupling element
34 transmission gear
36 holding unit
38 bearing unit
40 bearing element
42 tool presetting and/or tool measuring apparatus
44 tool presetting and/or tool measuring apparatus device
46 tool clamping unit
48 first coupling position
50 second coupling position
52 measuring tower
54 optical measuring device
56 stroke element
58 angle sensor unit
60 gripper unit
62 corresponding torque transfer element
64 clamping element
66 clamping region
68 holding element
70 connection mechanism
72 recess
74 tool receiving opening
76 handling robot
78 end position
80 end position
82 measuring table
84 spindle unit
86 base body
88 control and/or regulation unit
90 attachment holder
92 tensioning element
94 wall
96 switch element
98 torque transfer element
100 torque receiving element
102 positioning unit
104 actuation element
106 torque sensor
108 drive motor
110 drive shaft
112 torque generation unit
114 further drive motor
116 external toothing
118 further form-fit coupling element
120 external toothing
122 bearing rail
124 external toothing
126 additional further form-fit coupling element
128 method step
130 method step
132 method step
134 method step
136 method step
138 method step
140 method step
142 method step
144 method step
146 method step
148 method
150 method step
152 collet

The invention claimed is:

1. A tool presetting and/or tool measuring apparatus device comprising
a carrier unit; and
a spindle unit,
wherein the spindle unit is supported by the carrier unit,
wherein the spindle unit is at least configured for a rotation of an object inserted in the spindle unit around a spindle axis of the spindle unit,
wherein the spindle unit comprises at least one drive unit for generating the rotation movement of the object,
wherein the tool presetting and/or tool measuring apparatus device further comprises a further drive unit that is implemented to be separate and/or different from the drive unit,
wherein the tool presetting and/or tool measuring apparatus device further comprises a holding unit that is configured for holding the further drive unit on the carrier unit,
wherein the holding unit comprises a bearing unit that is configured to support the further drive unit in a movable manner,
wherein the spindle unit comprises a coupling unit that is configured to drive the spindle unit in at least two differing modes, and
wherein a movement of the further drive unit by means of the bearing unit is configured for activating respectively one of the two modes.

2. The tool presetting and/or tool measuring apparatus device according to claim 1,
wherein the spindle unit generates an essentially higher maximum spindle torque in a second mode of the two modes that can be generated by the coupling unit than in a first mode of the two modes that can be generated by the coupling unit.

3. The tool presetting and/or tool measuring apparatus device according to claim 1,
wherein the coupling unit is configured to couple the further drive unit with the spindle unit.

4. The tool presetting and/or tool measuring apparatus device according to claim 1,
wherein the coupling unit comprises a form-fit coupling element.

5. The tool presetting and/or tool measuring apparatus device according to claim 4,
wherein the form-fit coupling element is embodied as a gear wheel that is centered around the spindle axis.

6. The tool presetting and/or tool measuring apparatus device according to claim 1,
wherein the further drive unit is at least configured, in a coupled state of the coupling unit, to generate a further rotation movement of the object,
wherein the further rotation movement of the object is independent from the drive unit, and wherein the rotation movement and the further rotation movement comprise a rotation around an identical spindle axis.

7. The tool presetting and/or tool measuring apparatus device according to claim 1,
wherein the further drive unit comprises a transmission gear.

8. The tool presetting and/or tool measuring apparatus device according to claim 1,
wherein the bearing unit comprises a bearing element that is configured to generate, in an at least partially automated manner, a movement of the further drive unit.

9. A tool presetting and/or tool measuring apparatus comprising
a tool presetting and/or tool measuring apparatus device according to claim 1.

10. The tool presetting and/or tool measuring apparatus according to claim 9, further comprising
a tool clamping unit for a clamping-in and/or clamping-out of tools into/from tool holders with union nuts that are accommodated in the spindle unit,
the tool clamping unit being configured for a tightening or releasing of the union nuts by a rotation of the spindle unit around the spindle axis.

11. A method for an operation of a tool presetting and/or tool measuring apparatus device, the tool presetting and/or tool measuring apparatus device comprising
a carrier unit and a spindle unit,
wherein the spindle unit is supported by the carrier unit,
wherein by means of the spindle unit at least one object inserted in the spindle unit is rotated around a spindle axis of the spindle unit,
wherein the spindle unit comprises at least one drive unit for generating the rotation movement of the object,
wherein the tool presetting and/or tool measuring apparatus device further comprises a further drive unit that is implemented to be separate and/or different from the drive unit,
wherein the tool presetting and/or tool measuring apparatus device further comprises a holding unit that holds the further drive unit on the carrier unit,
wherein the holding unit comprises a bearing unit that supports the further drive unit in a movable manner, and
wherein the spindle unit comprises a coupling unit,
the method comprising, for the purpose of changing a maximally achievable spindle torque, driving the spindle unit in two differing modes, depending on a coupling position of the coupling unit,
wherein a movement of the further drive unit by means of the bearing unit activates respectively one of the two modes.

12. The method according to claim 11,
wherein the coupling unit has at least two coupling positions,
wherein in a first coupling position the spindle unit is driven in the first mode by a drive unit, and
wherein in a second coupling position the spindle unit is driven in the second mode, alternatively to the drive unit or in addition to the drive unit, by a further drive unit that is implemented to be separate and/or different from the drive unit.

13. The method according to claim 12,
wherein in a coupling process of the coupling unit, in which coupling process the further drive unit is coupled with the spindle unit, the spindle unit is rotated by the drive unit with a low rotation speed.

* * * * *